Patented Jan. 2, 1951

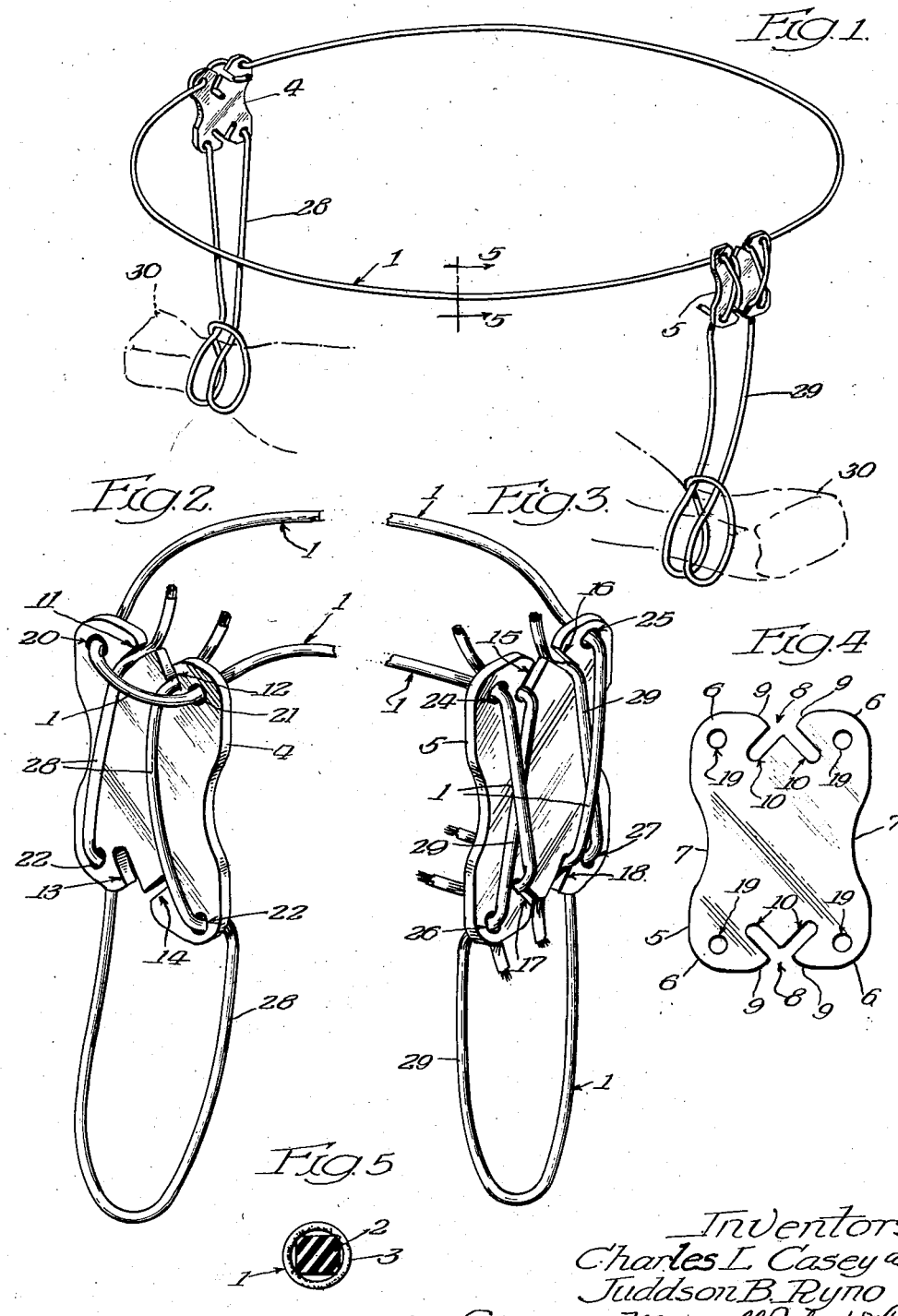

2,536,796

UNITED STATES PATENT OFFICE 2,536,796

CATAMENIAL BANDAGE BELT

Charles L. Casey, Riverside, and Juddson B. Ryno, Chicago, Ill., assignors to Reliable Metal Engineering Co., Chicago, Ill., a firm Application September 22, 1949, Serial No. 117,224

7 Claims. (Cl. 128—291)

This invention relates to belts for supporting and maintaining a catamenial bandage in wearing position.

An important object of the present invention resides in the provision of a new and improved bandage supporting belt which is extremely light in weight, which can be readily manufactured at a very low cost, and which is adapted to be applied quickly and easily.

Another important object of the invention is the provision of a bandage supporting belt having a plurality of slender elastic cord-like bands which are threaded through and are interconnected by plates permitting adjustment of the bands without the use of pins, hooks, snap fasteners and the like, the parts of the belt being constructed and assembled in a manner such that adjustment may be made easily and readily, but slippage is prevented while the belt is being worn.

A further object of the invention is the provision of a bandage supporting belt which is assembled and constructed in a manner such that its parts will not cause noticeable bulges and ridges to appear in a person's clothing while the belt is being worn, and will not scratch or bruise the body of a person wearing the belt.

A still further object of the invention is the provision of a supporting belt which may be assembled easily, which is readily washable, and which may be formed so as to grasp tightly the end portions of a catamenial bandage whereby the said bandage may be supported and held in proper wearing position.

Numerous other objects and advantages will be apparent throughout the progress of the specification which follows:

The accompanying drawing illustrates a selected embodiment of the invention, and the views therein are as follows:

Fig. 1 is a perspective view showing the belt arranged in the manner in which it is worn by a person;

Fig. 2 is a perspective view showing the left-hand belt adjustment plate and the left-hand bandage supporting cord forming parts of the belt illustrated in Fig. 1;

Fig. 3 is a perspective view showing the right-hand belt adjustment plate and the right-hand bandage supporting cord forming parts of the belt illustrated in Fig. 1;

Fig. 4 is a front elevational view showing a preferred construction for an adjustment plate; and Fig. 5 is a detail transverse section on line 5—5 of Fig. 1.

The particular embodiment of the invention herein disclosed for the purpose of describing the invention comprises an elastic cord 1 which is adapted to be formed into a loop, Fig. 1, so that it may be worn as a belt about the waist of a person. The cord 1 may be made of any suitable resilient material capable of being stretched elastically, but preferably consists of a slender elongated strip 2 of rubber or rubber-like material, Fig. 5, which is covered throughout its entire length by a cloth sheath 3. The cloth sheath is woven about the rubber strip 2 in any suitable manner which will render it capable of being stretched longitudinally, so that the rubber strip and the cloth sheath may be stretched together as a unit.

The middle portion of the cord 1 is threaded through a first plate or member 4, and the end portions of the cord 1 are threaded through a second plate or member 5. The plates or members 4 and 5 may be made of synthetic resin or any other suitable material, and are preferably identical in size and shape.

A preferred shape for the plates or members 4 and 5 is clearly illustrated in Fig. 4. The plate or member therein shown is substantially rectangular in shape and is provided with rounded corners 6 and inwardly curved side edges 7. The top and bottom edges of each plate or member are provided at their middle portions with inwardly extending notches 8, the outer ends of these notches being curved or flared outwardly at their outer ends as indicated at 9, Fig. 4. The particular shape of the plates or members 4 and 5, described hereinbefore, is desirable in that there are no sharp corners which, if present, might bruise or scratch the wearer's body, or tear her clothing.

The inner end of each notch 8 is bifurcated to provide a pair of angularly diverging slits 10, 10, Fig. 4. To facilitate the description of the particular arrangement and assembly of parts in the embodiment herein illustrated, the two slits 10 comprising the upper pair of slits in plate 4 are indicated specifically by 11 and 12, while the two slits 10 comprising the lower pair of slits in plate 4 are indicated specifically by 13 and 14. For like reasons, the two slits 10 comprising the upper pair of slits in plate 5 are indicated specifically by 15 and 16, while the two slits 10 comprising the lower pair of slits in plate 5 are designated specifically by 17 and 18, Figs. 2 and 3.

Each adjustment plate or member has four bores or openings 19 formed therein, Fig. 4, each bore or opening being located near a corner of the plate. Again, for the purpose of describing the arrangement and assembly of parts, the two upper openings in the plate 4 are designated specifically by 20 and 21, while the two lower openings in the latter said plate are designated specifically by 22 and 23. Similarly, the two upper openings in the plate 5 are designated particularly by 24 and 25, and the two lower openings in that plate are designated specifically as 26 and 27. The openings 19, specifically designated by 20—27, are each large enough so as to receive loosely the elastic cord 1 or other elastic cords of the same diameter. The upper openings 20 and 21 in the plate 4 and the upper openings 24 and 25 in the plate 5 are adapted to receive threadedly the elastic cord 1. The lower openings 22, 23 in the plate 4 and the lower openings 26, 27 in the plate 5 receive elastic bandage supporting cords 28 and 29, respectively, which are adapted to receive and support a catamenial bandage 30 at its ends. The elastic cords 28 and 29 are preferably equal in length and are identical in construction with, but shorter than, the elastic cord 1. When the belt is not being worn, the elastic cords 28 and 29 depend downwardly in U-shaped formations from plates 4 and 5 as shown clearly in Figs. 2 and 3. While the belt is worn, the lower parts of the elastic cords 28 and 29 may be looped as shown in Fig. 1 so as to receive the opposite ends of the bandage 30, these looped parts being drawn tightly about the bandage after the ends of the bandage have been properly inserted therethrough.

The belt may be assembled by first threading one end of the elastic cord 28 through the bore 22, Fig. 2, in one direction and inserting it into the slit 11. The other end of the cord 28 is then threaded through the bore 23, in the same direction that the first said end was threaded, and the said other end is inserted into the slit 12, thereby causing the cord 28 to be attached to the plate 4.

A similar procedure is followed for attaching the elastic cord 29 to the plate 5. One end of this cord is threaded through the bore 26 in one direction and is inserted into the slit 15. The other end of the cord 29 is then threaded through the bore 27 in the same direction that the first said end was threaded, and the said other end is inserted into the slit 16, Fig. 3.

Finally, the cord 1 is attached to the plates 4 and 5 by first threading it through the bores 20 and 21 in the plate 4 as clearly shown in Fig. 2 so that the plate 4 is suspended from the middle portion of the cord 1. One end of the cord 1 is then threaded through the bore 24 in the plate 5 and is inserted into the slit 17. The other end of the cord 1 is threaded through the bore 25 and inserted into the slit 18, whereby the belt is in complete assembled condition.

The width of each of the slits 10 in the plates 4 and 5 is less than the normal outside diameter of the elastic cords 1, 28, and 29, so that any stretching of the elastic cords causes their end portions to be drawn more tightly into the slits 10. Slippage, therefore, may not occur between the adjustment plates and these cords while the belt is being worn.

The invention provides a belt for supporting catamenial bandages which is simply constructed and which may be easily assembled. The belt comprises a pair of plates to which elastic cords 1, 28 and 29 are attached. The elastic cord 1 may be arranged in a loop, Fig. 1, so that a person may step therethrough and bring the cord 1 about her waist and immediately above her hips. One of the plates to which the cord 1 is attached is preferably arranged at the front of the wearer's body and an elastic cord for supporting one end of a catamenial bandage depends downwardly therefrom. The other plate to which the cord 1 is attached is arranged at the back of the wearer's body, and an elastic cord for supporting the other end of the bandage depends downwardly therefrom. The various elastic cords are removably attached in a novel manner to the plates whereby the effective length of each of these cords may be adjusted so that the belt is properly fitted for the wearer. Also, the elastic properties of the cords 1, 28 and 29 allow these members to expand or contract in length according to the body movements of the wearer. The belt therefore may be worn without causing the wearer any discomfort therefrom.

Changes may be made in the form, construction and arrangement of the parts without departing from the spirit of the invention or sacrificing any of its advantages, and the right is hereby reserved to make all such changes as fall fairly in the scope of the following claims.

The invention is hereby claimed as follows:

1. A belt for supporting a catamenial bandage comprising a pair of identical plate-like members, each having holes and slits formed therein, a waist cord to encircle the waist of a wearer and passing through certain holes of each member, the free ends of said cord being received in certain slits of one member and locked therein, a bandage cord receivable in holes of one member and extending therefrom in the form of a loop, the free ends of said bandage cord being received in certain of said slits of the latter member, a second bandage cord receivable in holes in the other member and extending therefrom in the form of a loop, the free ends of the second bandage cord being receivable in certain of said slits in the latter member.

2. A belt for supporting a catamenial bandage comprising a pair of identical plate-like members, each having holes and slits formed therein, a waist cord to encircle the waist of a wearer, and threaded through certain of said holes of each member, a bandage cord threaded through certain holes of one member, a second bandage cord threaded through certain holes of the other member, and means to lock the free ends of each cord to a plate like member.

3. A belt for supporting a catamenial bandage comprising a pair of identical plate-like members, each having holes and slits formed therein, a waist cord to encircle the waist of a wearer, and threaded through certain of said holes of each member, a bandage cord threaded through certain holes of one member, a second bandage cord threaded through certain holes of the other member, the free ends of the waist cord and the free ends of one bandage cord being received in certain slits of one member and the free ends of the other bandage cord being received in certain slits of the other member.

4. A belt of the class described comprising a first plate-like member having holes and slits formed therein, a waist encircling cord threaded through said holes with the free ends of the cord extending from the plate, a bandage cord passing through certain of said holes and depending in a loop from said plate to permit securement of one end of the bandage, the free ends of the bandage cord being receivable in certain of said slits, a second plate-like member having holes and slits formed therein, the said waist cord passing certain of said holes in the second member and having the free ends of the waist cord locked in certain of said slits of the second plate, and a second bandage cord passing through certain of said holes in the second member and depending in a loop from said latter holes, to permit securement of the other end of the bandage, the free ends of the second bandage cord being receivable in certain of said slits in the second plate member.

5. A belt of the class described comprising a first plate-like member having a pair of upper holes and a pair of upper slits, a waist encircling cord threaded through said holes with the free ends of the cord extending from the plate, said member having a pair of lower holes therein, a bandage cord passing through the latter holes and depending in a loop from said latter holes to provide fastening means for one end of the bandage, the free ends of the bandage cord being receivable in said slits and locked therein by impingement, a second plate-like member having upper and lower holes and slits therein, the said waist cord passing through the upper holes and having the free ends locked in the slits of the second plate, and a second bandage cord passing through the lower holes of the second member and depending in a loop from said latter holes to provide fastening means for the other end of the bandage, the free ends of the second bandage cord being receivable in certain slits in the second plate member.

6. A belt of the class described comprising a first plate-like member having a pair of upper and lower holes and a pair of upper slits, a waist encircling cord threaded through said upper pair of holes with the free ends of the cord extending from the plate, a bandage cord passing through the pair of lower holes and depending therefrom in a loop, the free ends of the bandage cord being receivable in said slits, a second plate-like member having upper and lower holes therethrough and converging slits at the upper and lower ends and positioned centrally of the second plate member, the said waist cord passing through the upper holes of the second member and having the free ends thereof locked in the lower slits of the second plate, and a second bandage cord passing through the lower holes of the second member and depending in a loop from said latter holes, the free ends of the second bandage cord receivable in the upper slits in the second plate member, the depending loops providing attaching means for the ends of the bandage.

7. A belt for supporting a catamenial bandage in wearing position, said belt comprising a length of elastic cord adapted to encircle the waist of a person, a pair of members each having a first pair of openings therein through which said cord is threaded, at least one of said members being provided with a first pair of slits in which portions of said cord are inserted, and a pair of elastic bandage supporting cords depending from said members, one of the said bandage supporting cords being threaded through a second pair of openings provided in one of said members and having portions thereof inserted in a second pair of slits provided in the last said member, the other of said bandage supporting cords being threaded through a second pair of openings provided in the other member and having portions thereof inserted in a second pair of slits provided in the latter said member.

CHARLES L. CASEY.
JUDDSON B. RYNO.

No references cited